United States Patent [19]

Weiss

[11] 4,255,540
[45] Mar. 10, 1981

[54] NEUTRALIZED PHOSPHONATED ELASTOMERIC POLYMERS

[75] Inventor: Robert A. Weiss, Summit, N.J.

[73] Assignee: Exxon Research & Engineering Co., Florham Park, N.J.

[21] Appl. No.: 31,542

[22] Filed: Apr. 19, 1979

[51] Int. Cl.$^3$ ............................ C08F 8/44; C08F 8/42; C08F 8/40
[52] U.S. Cl. .................................. 525/332; 525/340
[58] Field of Search ................................ 525/340, 332

[56] References Cited

U.S. PATENT DOCUMENTS

| | | | |
|---|---|---|---|
| 3,097,194 | 7/1963 | Leonard et al. | 525/340 |
| 3,290,276 | 12/1966 | Anderson | 525/340 |
| 3,397,219 | 8/1968 | Ford et al. | 525/340 |
| 4,102,876 | 7/1978 | Brenner et al. | 525/340 |

*Primary Examiner*—William F. Hamrock
*Attorney, Agent, or Firm*—Richard E. Nanfeldt

[57] ABSTRACT

This invention relates to a process for the manufacture of a neutralized phosphonated ethylene-propylene copolymer having about 1 to about 150 mmoles of $PO_3H_2$ groups which are neutralized with a counterion selected from the group comprising metal cations, ammonium or amines. Elastomeric compositions used for elastomeric articles could include the neutralized phosphonated ethylene-propylene copolymer having about 20 to about 200 parts by weight of a non-polar process oil per 100 parts of the phosphonated copolymer and about 25 to about 300 parts by weight of a filler per 100 parts of the phosphonated copolymer, wherein a preferential plasticizer can also be incorporated into the composition. These blend compositions can be readily processed on conventional plastic fabrication equipment into elastomeric articles having excellent physical properties and desirable rubber characteristics.

2 Claims, 1 Drawing Figure

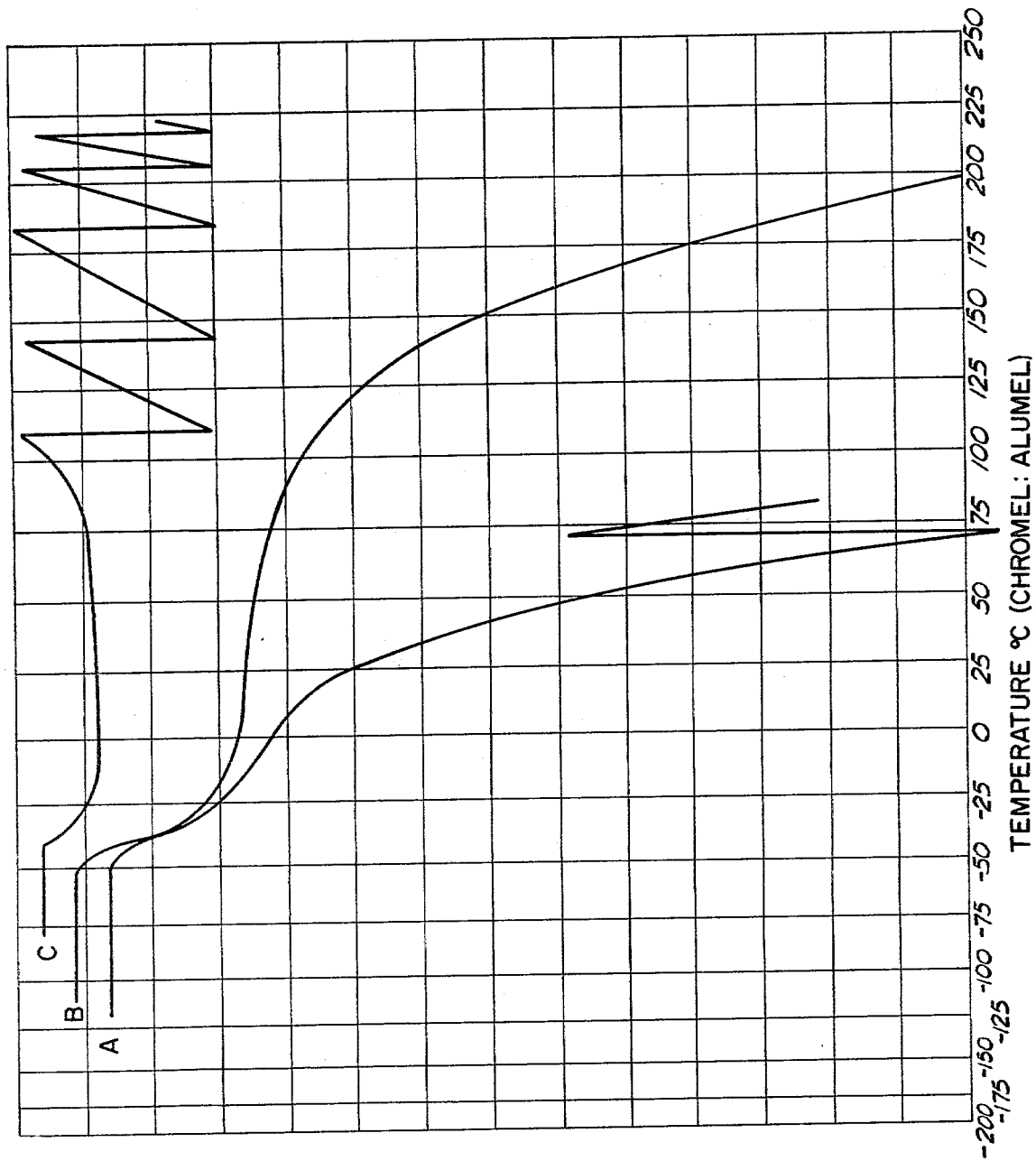

NEUTRALIZED PHOSPHONATED ELASTOMERIC POLYMERS

BACKGROUND OF THE INVENTION

1. Field of the Invention

This invention relates to a process for the manufacture of a neutralized phosphonated ethylene-propylene copolymer having about 1 to about 150 mmoles of $PO_3H_2$ groups which are neutralized with a counterion selected from the group comprising metal cations, ammonium or amines. Elastomeric compositions used for elastomeric articles could include the neutralized phosphonated ethylene-propylene copolymer having about 20 to about 200 parts by weight of a non-polar process oil per 100 parts of the phosphonated copolymer and about 25 to about 300 parts by weight of a filler per 100 parts of the phosphonated copolymer, wherein a preferential plasticizer can also be incorporated into the composition. These blend compositions can be readily processed on conventional plastic fabrication equipment into elastomeric articles having excellent physical properties and desirable rubber characteristics.

2. Description of the Prior Art

British Pat. No. 907,765 is directed to the phosphonation of polypropylene which is thermoplastic in nature and is non-applicable to the elastomeric compositions of the instant invention. Similarly, an article entitled, "Chlorophosphorylated Atactic Polypropylene" by D. Bellus et al in Vysokomol. Soyed. 5: No. 1, 145–150 (1963) teaches the phosphonation of atactic polypropylene. Phosphonated polyethylene resins have been disclosed previously, most recently in an article, entitled "Properties of Polyethylene Modified With Phosphonate Side Groups. I. Thermal and Mechanical Properties" by R. A. Weiss et al in the Journal of Polymer Science; Polymer Physics Edition, Vol. 15, 1409–1425 (1977).

U.S. Pat. No. 3,097,194 and British Pat. No. 849,058 teach a method for the preparation of the phosphonic acid derivative of an ethylene-propylene copolymer which is subsequently vulcanized on a two roll mill. This patent fails to teach, imply or infer the process of the instant invention for the formation of a neutralized phosphonated ethylene-propylene copolymer which can be readily fabricated due to its superior rheological properties on conventional plastic fabricating equipment into high performance elastomeric articles.

SUMMARY OF THE INVENTION

It has been found, surprisingly, that a new and useful elastomeric polymer, a neutralized phosphonylated ethylene-propylene copolymer, can be formed by a solution process, wherein the ethylene-propylene copolymer dissolved in a suitable solvent is phosphonylated with a mixture of phosphorous trichloride and oxygen to form the elastomeric phosphonyl dichloride (—$POCl_2$) which is further hydrolyzed by the addition of water to form the elastomeric phosphonic acid (—$PO(OH)_2$). The elastomeric phosphonic acid is then neutralized in solution with a base (e.g., sodium hydroxide) to form the neutralized phosphonated ethylene-propylene (EP) copolymer. Elastomeric blends can be formed from these neutralized phosphonated EP copolymers. In particular, a neutralized phosphonated elastomeric polymer, inorganic fillers, a non-polar process oil and optionally a preferential plasticizer have suitable rheological and physical properties for the formation of elastomeric articles.

These neutralized phosphonated elastomeric polymers are useful in forming unique and novel compositions of matter which are readily used to produce a high performance elastomeric article by a low pressure injection molding or extrusion process.

The class of compounds described in the instant invention are based on phosphonated ethylene-propylene copolymers which can be processed on plastics type extrusion equipment at high rates and which possess improved physical characteristics such as abrasion, flexibility and rubbery feel.

A substantial segment of the plastics and rubber fabrication industry employs a fabrication technique known as low pressure injection molding to form articles which can be classified as injection molded articles. An application employing this fabrication technique is elastomeric footwear which requires materials which are flexible and tough. Two broad classifications of materials which have been used are vulcanized elastomers and plasticized thermoplastics such as polyvinyl chloride (PVC). The fabrication of injection molded articles based on vulcanized elastomers is a major item of cost involving the vulcanization procedure. Not only is this step costly from an energy intensive viewpoint, but it is time consuming. The use of plasticating injection molding equipment for thermoplastic materials is more economical and results in high production rates for materials such as plasticized PVC. While these materials possess a degree of flexibility, they do not have a good rubbery feel or good low temperature flexibility. It is, therefore, desirable to have materials which can be processed on plastics type injection molding equipment at conventional plastics rates and which possess the flexibility and subjective rubbery characteristics of vulcanized elastomers.

BRIEF DESCRIPTION OF THE DRAWINGS

FIG. 1 illustrates a thermomechanical analysis curve of a phosphonated ethylene-propylene elastomer.

GENERAL DESCRIPTION

This present invention relates to a unique and novel process for forming novel neutralized phosphonated ethylene-propylene copolymers useful in forming a blend compositions of a neutralized phosphonated ethylene-propylene copolymer, an inorganic filler, and a nonpolar process oil, wherein the compositions are readily processable in conventional plastic processing equipment into a high performance elastomeric article such as footwear. The resultant elastomeric article has excellent low and elevated temperature flexibility, excellent abrasion resistance, excellent flex fatigue, superior dimensional stability, good resilience, and a rubber-like feel.

Various critically selected additives can be incorporated into the blend compositions such as a preferential plasticizer, a polyolefinic thermoplastic for further modification of hardness as well as rheological properties, a whitening pigment, a lubricant for improvement of the physical appearance as well as the ability to easily eject the formed article from the mold during the injection molding process and a reinforcing filler such as silica or carbon black, wherein the reinforcing filler constitutes a minor portion of the composition.

The preferred ethylene-propylene copolymers of the instant invention contain 35 to 80 wt. % ethylene, the balance of the polymer being propylene. Preferably the polymer contains 40-70 wt. % ethylene.

A typical ethylene-propylene copolymer is Vistalon 404 (Exxon Chemical Co.) a copolymer having a Mooney Viscosity (ML, 1+8, 212° F.) of about 40 and having an ethylene content of about 40 wt. %. The $\overline{M}n$ as measured by GPC of Vistalon 404 is about 20,000, the $\overline{M}v$ as measured by GPC is about 350,000 and the $\overline{M}w$ as measured by GPC is about 500,000.

Another ethylene-propylene copolymer is Exxon MD-714 (Exxon Chemical Co.) a copolymer having a Mooney Viscosity (ML, 1+8, 212° F.) of about 50 and having an ethylene content of about 50 wt. %.

The EP copolymers of this invention have a number average molecular weight as measured by GPC of about 10,000 to about 200,000, more preferably of about 15,000 to about 100,000 and most preferably of about 20,000 to about 60,000. The Mooney viscosity (ML, 1+8, 212° F.) of the ethylene-propylene copolymer is about 5 to about 60, more preferably about 10 to 50, most preferably about 15 to 50. The $\overline{M}v$ as measured by intrinsic viscosity of the ethylene-propylene copolymer is preferably below about 350,000. The $\overline{M}w$ as measured by GPC of the ethylene-propylene copolymer is preferably below about 500,000.

In carrying out the invention, the elastomeric EP copolymer is dissolved in either the phosphonylating reagent or in a non-reactive solvent such as benzene, chlorobenzene or dichlorobenzene.

The phosphonylating reagent, PCl$_3$, is added to the solution of the ethylene propylene copolymer at a ratio to the polymer of about 1 to 10 w/w or greater. Oxygen is bubbled through the agitated solution at a temperature of about 0° to about 60° C. in order to effect the phosphonylation reaction.

When the desired level of phosphonylation is achieved after a sufficient period of time, the excess PCl$_3$ and side product POCl$_3$ are flashed off under vacuum. The resultant product polymer (phosphonyl dichloride), R-POCl$_2$, is steam stripped effecting both recovery of the polymer and conversion to the polymer (phosphonic acid) by the following reaction.

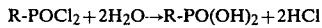

R-POCl$_2$ + 2H$_2$O → R-PO(OH)$_2$ + 2HCl

Alternatively, the reaction solution containing the polymer (phosphonyl dichloride) and the excess reagents can be mixed with ice resulting in conversion of the polymer (phosphonyl dichloride) to the polymer (phosphonic acid) and the hydrolysis of any unreacted PCl$_3$ and POCl$_3$. The product polymer can then be recovered by filtration.

The phosphonic acid form of the phosphonylated ethylene-propylene copolymer has about 1 to about 150 mmoles PO$_3$H$_2$ groups per 100 grams of phosphonylated polymer, more preferably about 15 to about 70, and most preferably about 20 to about 65. The mmoles of PO(OH)$_2$/100 grams of polymer is determined by phosphorous analysis.

The acid form of the phosphonylated polymer is gel free and hydrolytically stable. Gel is measured by stirring a 2 wt. % mixture of polymer in an appropriate solvent such as toluene or a toluene/methanol mixture where the alcohol comprises from 1 to 10 percent of the total volume, for 29 hours, allowing the mixture to settle, withdrawing a weighed sample of the supernatant solution, and evaporating to dryness.

Neutralization of the acid form of the phosphonylated elastomeric polymer is done by the addition of a solution of a basic salt to the acid form of the phosphonylated ethylene-propylene copolymer dissolved in the mixture of the aliphatic alcohol and non-reactive solvent. The basic salt is dissolved in a binary solvent system consisting of water and/or an aliphatic alcohol. The counterion of the basic salt is selected from the group consisting of antimony, aluminum, and metal ions of Groups IA, IIA, IB and IIB of the Periodic Table of Elements and mixtures thereof. The anion of the basic salt is selected from a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the ethylene-propylene copolymer to effect neutralization. It is preferable to neutralize at least 95% of the acid groups, more preferably about 98%, most preferably 100%.

Examples of metal oxides useful in preparing metal phosphonates are MgO, CaO, BaO, XnO, and Ag$_2$O. Useful examples of metal hydroxides are NaOH, KOH, LiOH, Mg(OH)$_2$ and Ba(OH)$_2$.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity or lower melt index will be associated with the higher apparent molecular weight. The melt index of the systems investigated were determined by the use of a Custom Scientific Extrusion Plastometer. Generally, the melt index measurements were made at a temperature of 190° C. and at various shear rates corresponding to plastometer pressures of 43 lb/in$^2$ and 250 lb/in$^2$. The melt indices, described by ASTM standard D-1238, at 190° C. and 43 and 250 lb/m$^2$ are employed as characterization parameters in this invention.

The metal phosphonate containing polymers at the higher phosphonate levels possess extremely high melt viscosities and are thereby difficult to process. The addition of ionic group plasticizers, preferential plasticizers, markedly reduces melt viscosity and frequently enhances physical properties.

To the neutralized phosphonated elastomeric polymer can be added, in either solution or to the crumb of the acid form of the phosphonated elastomeric polymer, a preferential plasticizer selected from the group consisting of carboxylic acid having about 8 to about 30 carbon atoms, more preferably about 8 to about 22 carbon atoms, or basic salts of these carboxylic acids wherein the metal ion of the basic salt is selected from the group consisting of aluminum, iron, antimony, lead and metal ions of Groups IA, IIA, IB and IIB of the Periodic Table of Elements and mixtures thereof. The carboxylic acids are selected from the group consisting of lauric, myristic, palmitic, and stearic acids and mixtures thereof; e.g., zinc stearate, magnesium stearate, or zinc laurate.

The preferential plasticizer is incorporated into the neutralized phosphonated elastomeric polymer at less than about 60 parts by weight based on 100 parts by weight of the phosphonated polymer, more preferably at about 5 to about 40, and most preferably at about 10 to about 25. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from amines such as stearaminde, amides, ammonium and amine salts of carboxylic acids and mixtures thereof. The preferred plasticizers are selected from the carboxylic acids having 8 to 30 carbon atoms or metallic salts of the carboxylic acids and mixtures thereof. The resultant neutralized phosphonated elastomeric polymer with or without preferential plasticizer is isolated from the solution by conventional steam stripping and filtration.

The neutralized phosphonated elastomeric polymer can be blended with a filler and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called by Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The fillers employed in the present invention are selected from the group consisting of talcs, ground calcium carbonate, water precipitated calcium carbonate, and delaminated, calcined or hydrated clays and mixtures thereof. These fillers are incorporated into the blend composition at about 25 to about 300 parts by weight per 100 parts by weight of the phosphonated ethylene-propylene copolymer, more preferably at about 25 to about 250, and most preferably at about 25 to about 200. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table 1.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonte precipitated | Purecal U | 35 | 2.65 | .03–.04 | 9.3 |
| Delaminated clay | Polyfil XB | 30 | 2.61 | 4.5 | 6.5–7.5 |
| Hydrated clay | Suprex | | 2.6 | 2 | 4.0 |

TABLE I-continued

| Filler | Code # | Oil Absorption grams of oil/100 grams of filler | Specific Gravity | Avg. Particle Size Micron | pH |
|---|---|---|---|---|---|
| Calcined clay | Icecap K | 50–55 | 2.63 | 1 | 5.0–6.0 |
| Talc magnesium silicate | Mistron Vapot | 60–70 | 2.75 | 2 | 9.0–7.5 |

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 20 to about 200 parts by weight per 100 parts by weight of the phosphonated ethylene-propylene copolymer, more preferably at about 20 to about 175, and most preferably at about 25 to about 150.

TABLE II

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other additives can be incorporated into the blend compositions to improve the physical properties, the appearance, the chemical properties of the formed elastomeric article or to modify the processability of the blend compositions.

A crystalline polyolefinic thermoplastic can be optionally incorporated into the blend composition in minor proportions as a means for modification of the rheological properties of the blend compositions as well as the stiffness of the elastomeric article. Typically, the crystalline polyolefinic thermoplastic is added to the blend composition at a concentration level of less than about 100 parts by weight based on 100 parts by weight of the phosphonated ethylene-propylene copolymer, more preferably at about 1 to about 75; and most preferably at about 2 to about 50.

The crystalline polyolefin is characterized as a polymer of an alpha-olefin having a molecular weight of at least 2,000, preferably at least 10,000, and more preferably at least 20,000. This material comprises substantially an olefin, but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably, the polyolefins are selected from the group consisting of polyethylene, polybutene, polypropylene, and ethylene-propylene copolymers. It is critical that the crystalline polyolefin have a degree of crystallinity of at least 35%.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of less than about 25 parts by weight based on 100 parts of the phosphonated ethylene-propylene copolymer, more preferably about 1 to about 15. Alternatively, a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 5.0 parts by weight based on 100 parts of the neutralized phosphonated ethylene-propylene copolymer, wherein the metal ion of the metallic hydroxide is selected from Group IIA of the Periodic Table of Elements such as barium, calcium, or magnesium.

A lubricant can be employed in the blend composition at a concentration level of about 1 to about 20 parts by weight based on 100 parts by weight of the neutralized phosphonated elastomeric polymers, and more preferably about 1 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blends of phosphonated polymer, filler and oil, wherein the reinforcing filler is selected from the group consisting of silica, carbon black, and calcium silicate and mixtures therein. These reinforcing agents are generally characterized as having particle sizes below 0.1 microns and oil absorption above about 100. These reinforcing fillers are incorporated in the blend composition at about 1 to 50 parts by weight based on 100 parts by weight of the phosphonated ethylene-propylene copolymer, more preferably 1 to 25. The ratio of filler to reinforcing agent is at least about 1, more preferably about 2, and most preferably about 3.

The ingredients incorporated into the blend compositions of the present invention, in conjection with the type of elastomeric polymer, the degree of phosphonation, and the metal counterion of the neutralized phosphonated elastomeric polymer, and the preferential plasticizer give materials processable in low pressure injection molding equipment to high performance leastomeric articles.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1—PREPARATION OF PHOSPHONATED EPR

Fifty grams of an ethylene-propylene copolymer, MD-714 (Exxon Chemical Company), was dissolved in 908 g. of $PCl_3$ and 160 g. chlorobenzene. Oxygen was bubbled through the agitated solution for 2 hours, after which time the polymer solution was poured over cracked ice in order to precipitate the polymer and to convert the polymer (phosphonyl chloride), $R-POCl_2$, to the phosphonic acid derivative of the ethylene-propylene copolymer. The recovered phosphonylated ethylene-propylene copolymer was washed several times in a dilute aqueous solution of NaOH in a Waring Blender and dried under vaccum at 40° C. The phosphonic acid derivative of the ethylene-propylene copolymer was a white-gray nontacky, elastic solid. The phosphorous analysis was 2.07%.

The phosphonic acid derivative of ethylene-propylene copolymer was dissolved in a mixed chlorobenzene-methanol solvent (95/5 V/V) to which was added an excess of alcoholic sodium hydroxide in order to convert the phosphonic acid to the metal salt of the phosphonylated ethylene-propylene copolymer.

The improvement in mechanical properties by the introduction of phosphonic acid groups and by conversion to the Na salt is demonstrated by the TMA curves as seen in FIG. 1.

EXAMPLE 2

The procedure described in Example 1 was used to phosphonylate an ethylene-propylene copolymer, Vistalon 404 (Exxon Chemical Company). A series of materials were prepared by varying the concentration of reactants and the reaction time. The experiments are summarized in Table I.

The phosphonic acid derivatives were dissolved in an appropriate solvent, such as toluene or a toluene/methanol mixture containing from 1 to 10 percent alcohol by volume, to which was added an excess of alcoholic sodium hydroxide in order to convert the phosphonic acid to the metal salt. The increase in the apparent molecular weight of the polymers is demonstrated by a lowering of the melt index upon neutralization of the phosphonic acid derivative of ethylene-propylene copolymer as demonstrated in Table II. The mechanical properties of the modified ethylene-propylene copolymers were measured with an Instron Universal Testing Instrument using microdumbells cut from compression molded films. The improvement of mechanical properties by the introduction of phosphonic acid groups and by conversion to the Na salt is demonstrated in Table III.

TABLE I

CHLOROPHOSPHONYLATION EXPERIMENTS

| Experiment | V-404 (g) | PCl₃ (ml) | C₆H₅Cl (ml) | O₂ cc/min. | RXN Temp. (°C.) | RXN Time (min).[1] | Wt. Percent Phosphorus in Polymer |
|---|---|---|---|---|---|---|---|
| 5916-12 | 50 | 100 | 500 | 68 | 30–44 | 186 | 0.13 |
| 5916-17 | 25 | 100 | 700 | 68 | 37–38 | 30 | 0.11 |
| 5916-25 | 25 | 200 | 500 | 68 | — | 120 | 0.31 |
| 5916-37 | 25 | 200 | 500 | 195 | 25–50 | 60 | 0.72 |
| 3916-53 | 25 | 200 | 500 | 195 | 26 | 60 | 0.28 |
| 5916-66 | 25 | 200 | 600 | 195 | 22–56 | 30 | 0.41 |
| 5916-79[2] | 25 | 200 | 600 | 195 | 22–65 | 240 | 3.79 |
| 5916-88[2] | 25 | 200 | 600 | 195 | 26–88 | 180 | 3.17 |
| 5916-99 | 25 | 200 | 600 | 195 | 24–26 | 60 | 0.41 |
| 5916-116 | 25 | 200 | 600 | 195 | 24 | 30 | 0.19 |
| 5916-127 | 25 | 200 | 600 | 195 | 24–37 | 90 | 0.68 |
| 5916-138 | 25 | 200 | 600 | 195 | 22–23 | 60 | 0.26 |
| 5916-150 | 25 | 200 | 600 | 195 | 23–27 | 120 | 0.16 |
| 6180-1 | 25 | 200 | 600 | 195 | 24 | 30 | 0.32 |
| 6180-15[2] | 25 | 200 | 600 | 195 | 25–74 | 150 | 3.31 |
| 6180-25[2] | 25 | 200 | 600 | 195 | 25–45 | 210 | 2.56 |
| 6180-35 | 50 | 400 | 1200 | 195 | 26 | 120 | 0.03 |
| 6180-45[2] | 50 | 400 | 1200 | 681 | 24–49 | 120 | 2.27 |
| 6180-59 | 50 | 400 | 1200 | 681 | 24 | 75 | 0.12 |
| 6180-69[2] | 50 | 400 | 1200 | 681 | 24–58 | 150 | 1.94 |

[1] Reaction time corresponds to the total time in which oxygen was bubbled through the reaction solution.
[2] In these reactions the reaction solution became yellow in color.

TABLE II

MELT INDICES OF PHOSPHONATED - EPR

| Sample | Functional Group Conc. (mmoles phr) | MELT INDEX @ 190° C. (dg/min) | | | |
|---|---|---|---|---|---|
| | | @ 43 psi | | @ 250 psi | |
| | | Acid | Na-Salt | Acid | Na-Salt |
| Vistalon 404 | 0 | — | 0.23 | | 7.8 |
| 6180-35 | 1.0 | 0.27 | 0.18 | 8.0 | 8.9 |
| 5916-17 | 3.5 | 0.30 | 0.14 | 10.3 | 9.1 |
| 5916-12 | 4.2 | 0.34 | 0.13 | 11.4 | 4.1 |
| 5916-116 | 6.1 | 0.21 | 0.20 | 7.8 | 6.6 |
| 5916-138 | 8.4 | 0.22 | 0.20 | 7.6 | 6.4 |
| 5916-53 | 9.0 | 0.38 | 0.10 | 14.1 | 3.6 |
| 5916-25 | 10.0 | 0.30 | 0.17 | 10.6 | 5.5 |
| 6180-1 | 10.3 | 0.25 | 0.22 | 7.9 | 6.7 |
| 5916-66 | 13.2 | 0.32 | 0.10 | 11.2 | 4.1 |
| 5916-99 | 13.2 | 0.25 | 0.13 | 7.8 | 5.5 |
| 6180-45 | 73.2 | 20.7 | 0 | >60 | 0 |
| 5916-88 | 102.3 | 3.9 | 0 | 65.6 | 0.06 |
| 6180-15 | 106.8 | 2.5 | 0 | 28.1 | 0 |
| 5916-79 | 122.3 | 11.1 | 0 | >60 | 0.07 |

TABLE III

TENSILE PROPERTIES[1] OF PHOSPHONATED EPR

| Sample | Functional Group Conc. (mmoles phr) | ACID | | | | Na-SALT | | | |
|---|---|---|---|---|---|---|---|---|---|
| | | E₁₀₀ (psi) | T₃₀₀ (psi) | T_b (psi) | E_b (%) | E₁₀₀ (psi) | T₃₀₀ (psi) | T_b (psi) | T_b (psi) |
| Vistalon 404 | 0 | 28 | 19 | 3 | 920 | | | | |
| 6180-35 | 1.0 | 32 | 23 | 6 | 960 | 30 | 23 | 17 | 1,350 |
| 5916-17 | 3.5 | 28 | 19 | 8 | 780 | 36 | 23 | 14 | 330 |
| 5916-12 | 4.2 | 26 | 18 | 8 | 825 | 49 | 35 | 29 | 310 |
| 5916-116 | 6.1 | 29 | 14 | 9 | 540 | 37 | 27 | 4 | 1,400 |
| 5916-138 | 8.4 | 27 | 17 | 6 | 660 | 39 | 30 | 11 | 1,090 |
| 5916-53 | 9.0 | 21 | 13 | 3 | 650 | 31 | 25 | 14 | 2,000 |
| 5916-25 | 10.0 | 29 | 18 | 6 | 750 | 37 | 26 | 6 | 1,400 |
| 6180-1 | 10.3 | 25 | 16 | 2 | 640 | 34 | 22 | 1 | 820 |
| 5916-66 | 13.2 | 25 | 17 | 3 | 800 | 31 | 22 | 13 | 1,460 |
| 5916-99 | 13.2 | 21 | 14 | 3 | 560 | 35 | 24 | 2 | 930 |
| 6180-45 | 73.2 | 53 | 67 | 160 | 760 | — | — | 1,010 | 40 |
| 5916-88 | 102.3 | 47 | 40 | 8 | >4,000 | 1,010 | — | 1,240 | 160 |
| 6180-15 | 106.8 | 91 | 99 | 190 | 990 | 1,650 | — | 2,150 | 190 |
| 5916-79 | 122.3 | 53 | 48 | 12 | >4,000 | 760 | 1,910 | 2,280 | 360 |

1 - E₁₀₀ = secant modulus at an elongation of 100%
T₃₀₀ = stress at cm elongation of 300%
T_b = stress at break
E_b = ultimate elongation

What is claimed is:

1. A neutralized phosphonylated elastomeric ionically crosslinked copolymer of ethylene-propylene which has a number average molecular weight of at least 10,000 having about 15 to about 150 mmoles of neutralized phosphonic acid groups, said phosphonic acid groups being at least 95% neutralized with a counterion selected from the group consisting of ammonium, antimony, aluminum, and metal ions of Groups IA, IIA, IB, IIB of the Periodic Table of Elements and mixtures thereof.

2. A phosphonylated ethylene-propylene copolymer according to claim 1, which has about 20 to about 70 mmoles neutralized phosphonic acid groups.